(No Model.)   2 Sheets—Sheet 1.
J. R. CUMMINGS & G. E. LLOYD.
STEREOTYPER'S SAWING, TRIMMING, AND GROOVING MACHINE.
No. 405,662.   Patented June 18, 1889.
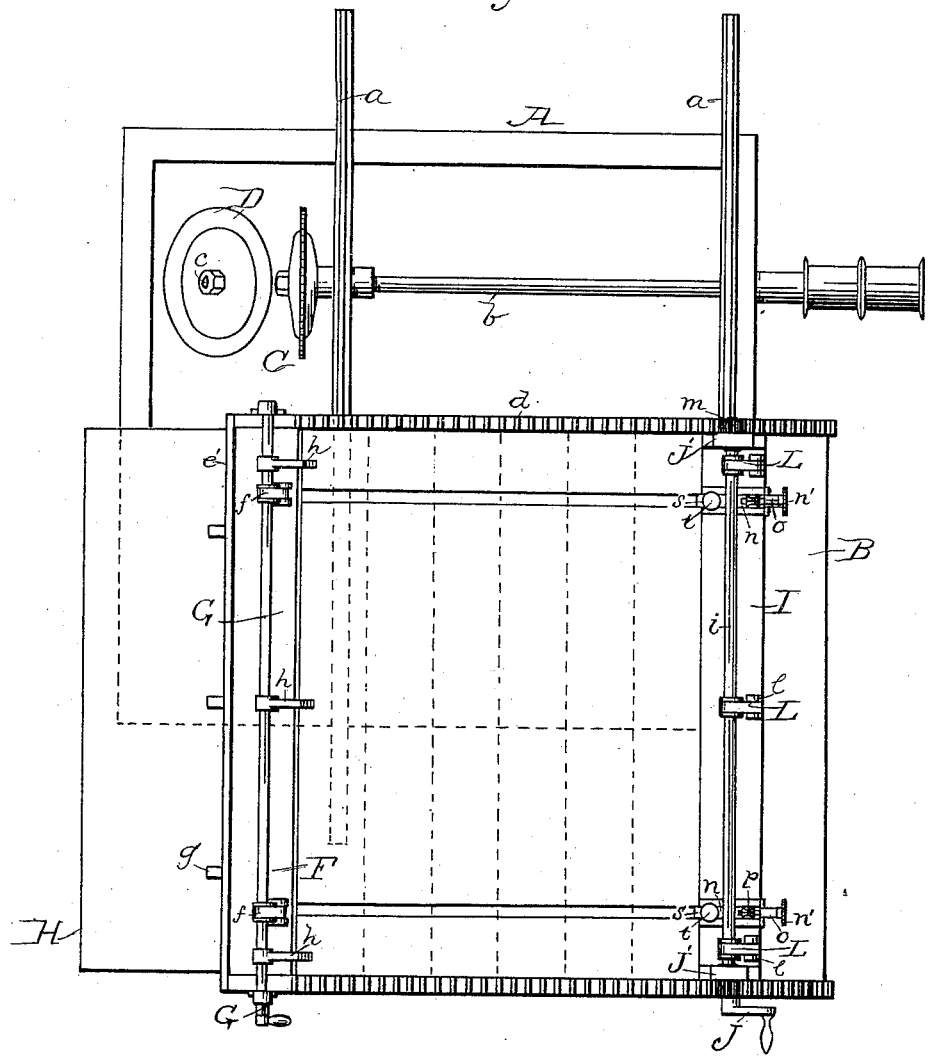

(No Model.) 2 Sheets—Sheet 2.
J. R. CUMMINGS & G. E. LLOYD.
STEREOTYPER'S SAWING, TRIMMING, AND GROOVING MACHINE.
No. 405,662. Patented June 18, 1889.
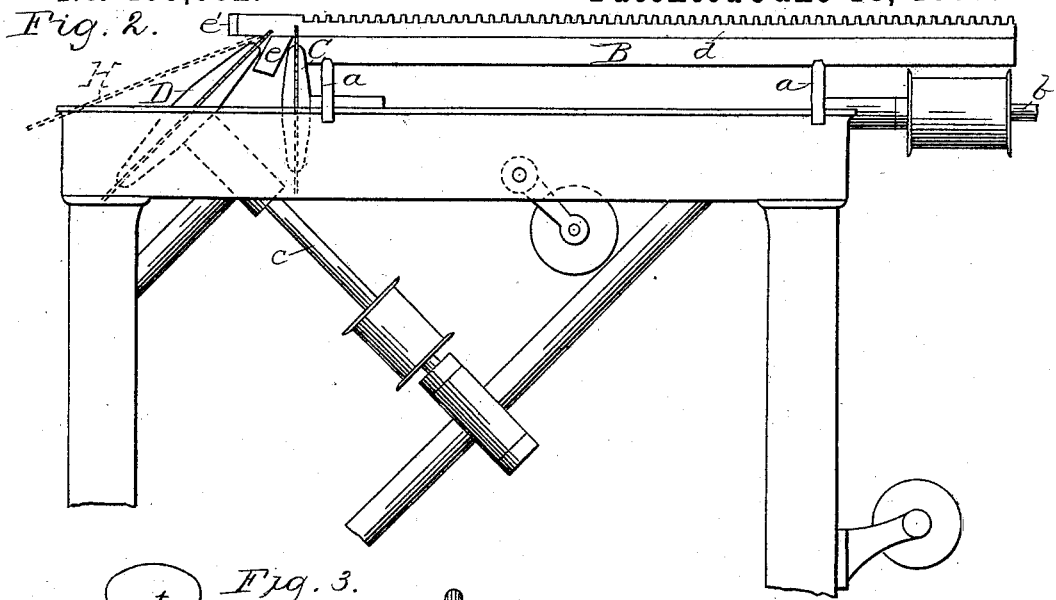
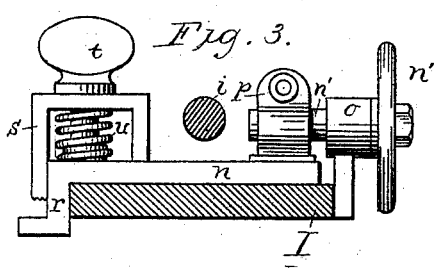
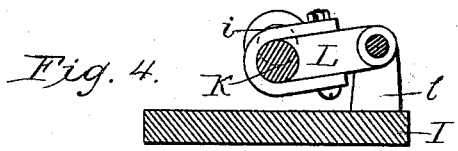
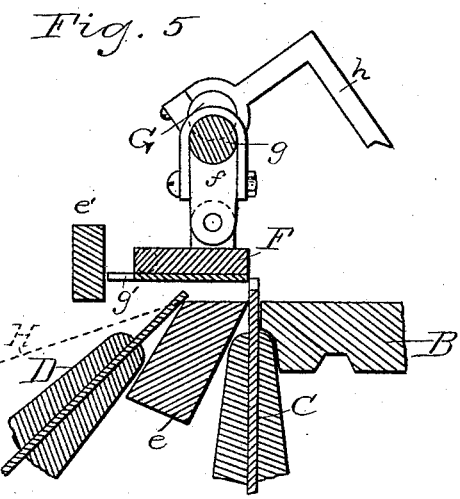
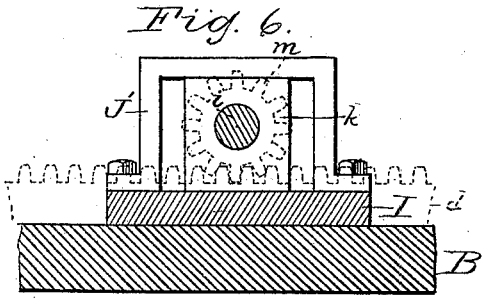
Witnesses
James H. Coyne,
Porter B. Coolidge.
John R. Cummings &
George E. Lloyd
Inventors
By their Attorney
Frank D. Thomason
N. PETERS, Photo-Lithographer, Washington, D. C.

UNITED STATES PATENT OFFICE.

JOHN R. CUMMINGS, OF NEW YORK, N. Y., AND GEORGE E. LLOYD, OF CHICAGO, ILLINOIS.

STEREOTYPER'S SAWING, TRIMMING, AND GROOVING MACHINE.

SPECIFICATION forming part of Letters Patent No. 405,662, dated June 18, 1889.

Application filed January 3, 1888. Renewed January 4, 1889. Serial No. 295,467. (No model.)

*To all whom it may concern:*

Be it known that we, JOHN R. CUMMINGS, of New York, New York county, and State of New York, and GEORGE E. LLOYD, of Chicago, Cook county, and State of Illinois, have invented certain new and useful Improvements in Stereotypers' Sawing, Trimming, and Grooving Machines, of which the following is a full, clear, and exact description, reference being had to the accompanying drawings and letters of reference marked thereon.

Heretofore in the manufacture of stereotyped newspaper-matter into column-lengths two or three machines have been used. The stereotyped matter was first cast in plates corresponding in dimensions to a page of newspaper-matter. It was then separated into columns by a suitable stereotyper's saw, and then its side edges trimmed upon a second machine. Each of said columns was then provided with a slanting groove centrally and longitudinally in its under surface by another machine, after which they were ready for use. A more recent innovation in the art of thus preparing these plates is to separate the columns of newspaper-matter on one machine and then trim the side edges thereof and groove them by one operation on a second machine.

Our invention consists in the separating of the plates into column-lengths and trimming and grooving of each of said columns (one at a time) in one operation and on one machine. This we accomplish by a machine having a bed upon which the stereotype-plate is placed, which is provided with means for adjusting the columns parallel to the line of incision of the grooving-saw and combined trimmer and separating-saw, which is also provided with means for moving said plate bodily transversely toward and into alignment with the said saw and then clamping the same, while said bed is moved longitudinally to and over said cutting and trimming and grooving devices, so as to complete said columns one at a time, substantially as hereinafter more fully described, and as illustrated in the drawings, in which—

Figure 1 is a plan view of our improved machine. Fig. 2 is a front elevation of the same, omitting the adjusting and clamping devices. Figs. 3, 4, 5, and 6 are detail views showing side elevations of and transverse sections of parts of the machine, showing in connection therewith the plate-adjusting and plate-clamping devices.

We do not desire to attach particular importance to the frame-work supporting our improved operating devices further than to state that the rectangular frame A is supported by suitable legs and has two parallel tracks $a\ a$ secured to and upon its end rails, upon which the bed B can be reciprocated longitudinally, and further than to state that one side rail is provided with suitable bearings for the outer journal of the transverse shafts $b$, carrying on its inner end the combined column separating and trimming cutter C. The inner journal of this shaft $b$ has its bearings, preferably, in a longitudinal girder connected to the end rails of rectangular frame A.

D represents the grooving-saw, the plane of whose incision is preferably at about right angles to the perpendicular incision of the cutter C, and its axis is located beyond the inner end of the shaft $b$, carrying said cutter. This saw D is mounted on the end of a shaft $c$, which extends downward at right angles to the plane of the saw into the space below frame A and bounded by the legs supporting the same, where it is journaled in suitable brackets, and is actuated by a system of belt transmission at a moderately high speed.

The periphery of cutter C projects up above the plane of the upper surface of the bed B, so as to separate the plate fed thereto into column-widths, and the highest segment of the periphery described by saw D is removed from said cutter a distance corresponding to about one-half the width of such column of matter, and is at such a plane that it makes the inclined groove in the bottom of said column centrally and longitudinally of the required depth.

The bed B is preferably of rectangular shape and of such an area that a stereotype-plate corresponding in dimension to a page of printed newspaper-matter can be placed thereon conveniently. Its end edges are provided with racks $d\ d$ thereon, which, besides the purpose they are mainly designed for, (hereinafter to be more fully explained,) have a longitudinal guard-strip e secured to the under surfaces of their projecting ends, which is parallel with the adjacent edges of the bed B a distance therefrom corresponding to the width of the teeth of the cutter C, thus making a longitudinal slot for the said cutter to project up through to cut the plates. The said racks d d are recessed transversely in a line with the slot so formed, so as to accommodate the projection of the said cutter as the bed is pushed over the same. The upper surface of strip e is on the same plane as the upper surface of the bed, and is of such width that the center of the column of newspaper-matter is suspended over the outer longitudinal edge thereof when the plate has been moved laterally against the gage-bar e', secured to the corresponding ends of said racks d d.

In order to clamp the column bearing against the gage-bar down upon the strip e, we provide a longitudinal presser-plate F, which is placed so that one edge is in vertical register with the edge of the bar e adjacent to the bed B, and which is of a width corresponding to about the width of a column of stereotyped matter. This plate F is oscillated from near the edge thereof farthest from the bed B upon pintles passing into and through the racks d d by links f f, which are pivoted at their lower ends between lugs arising from the back of said plate F, and have their upper ends journaled in a suitable manner on the offset parts g g of the longitudinal rock-shaft G. This shaft is journaled in suitable bearings secured to and arising from the racks d of the bed, and the end thereof contiguous to the front of the machine projects through its bearings and has a crank secured thereto, by means of which it can be oscillated. By properly oscillating shaft G the links f are reciprocated sufficiently to oscillate the plate F down upon the stereotype-plate to securely hold it while the column thereunder is being separated from said plate and at the same time trimmed and grooved. The under side of plate F is faced with leather or other suitable substance, so that when bearing down upon the stereotype-plate it will not injure the face of the type. It is likewise provided with the arms g', projecting laterally from the side farthest from the bed, which, when the side of plate F (over that part of the column of stereotyped matter resting upon strip e) is lifted up therefrom, oscillates downward, so as to tip the projecting edges of said column downward below the edge of the gage-strip e', whereupon its gravity can carry it down the inclined plane H. If the said inclined plane is not steep enough to do this, we prefer to secure arms h to the rock-shaft G, which are of such projection and construction that when the said shaft is oscillated so as to lift plate F off the column of stereotyped matter the said arms oscillate downward, and, striking the side edges of the column nearest the bed, push and send it sliding out from under said plate down said inclined plane into a suitable gutter or chute at the bottom thereof, from whence it can be conveniently removed.

In order to move the stereotype-plate transversely upon the bed, so that the columns thereof can be moved into perfect alignment with the cutter C, we provide a longitudinal feed-plate I, which moves transversely on the bed between the racks. To move the said feed-plate, we journal in suitable bearing, mounted on it at suitable points, a longitudinal shaft i, the ends of which project out over the racks and have pinions m thereon, which engage the same, so that by revolving said shaft through the medium of a crank j on its end nearest the front the plate is moved laterally toward or away from the clamping devices just described. It is desirable that the pinions engaging the racks should be of such diameter that one revolution of shaft i will move the feed-plate a distance corresponding to the width of a column of newspaper-matter.

When a column is separated from the stereotype-plate, there is often a thin strip of superfluous metal left between the line bordering the end type of the next adjacent column of matter and the side of the kerf last made by the cutter which must be removed or trimmed. As this is often so slight that the nicest adjustment is necessary, we prefer to so construct the shaft i that at the commencement and ending of each revolution thereof it will move the plate I very slowly, as compared to the speed of the movement thereof in the interim between the beginning and ending of said revolution. This we accomplish by securing transversely on plate I, immediately next the racks, guide-frames J' J', which are provided with rectangular openings, in which are placed the shaft-bearing blocks k k. These blocks reciprocate transversely in said openings, as will hereinafter be more fully explained.

K K K represent corresponding offsets or eccentrics in said shaft, located, preferably, near the bearings and at about the center of length of said shaft, which have journaled on them the oscillating arms L L L. The opposite ends of these arms are fulcrumed to the lugs l l l, arising from near the edge of said plate I preferably farthest from the clamping devices. The effect of this construction is that plate I is drawn forward more rapidly while the eccentrics are describing that part of the cycloid on the horizontal stretch than when describing the more perpendicular arcs thereof. Thus the operator can move the said plate so slowly at the beginning of the revolution that the advance thereof into cutting alignment with the cutter is easily gaged sufficiently to remove the superfluous edge.

Near the racks transversely in the plate I are made corresponding grooves m, into which a suitable tenon from the adjusting-plates n enters. These plates n n are adjustable slightly transversely by the gage-screws n', the smooth parts of the barrels of which are journaled in suitable bosses o o, secured to the edge of the plates I farthest from the clamping devices, and the screw-threaded part of which enters a tapped lug p, arising from said plate n nearest the end thereof adjacent to said boss. The opposite ends of these plates n n project slightly over the edges of plate I, and have depending from them the L-arms r r, the horizontal part of which rests in the grooves in which the tenons projecting from plate I move. Near the ends of plates n n, from which the said L-arms depend, are the clamp-plates s s, which are of an inverted-⊓ shape, and one end of which rests upon the transverse bar n, and the other end of which extends down in front of the adjacent end of said bar immediately over the horizontal part of the L-arms r, and are provided with teeth, as shown. Thumb-screws t pass down through the horizontal stretch of these ⌊⌋-shaped plates and are tapped into the bars n, and coil-springs u surround said screws between plates and bars n and hold said plate up against the heads of said screws. By manipulating said screws the toothed end of said plates may be brought nearer the horizontal part of the arms r r or withdrawn from it.

In operation, the full-page plate of stereotyped matter is placed upon the bed of the machine so that the columns run lengthwise the machine, and said plate is pushed up laterally against the longitudinal edge of plate I, so that the edges thereof can be clamped between the horizontal part of arms r and the toothed end of the clamping-plates s s. By revolving shaft i the plate I pushes the stereotype-plate laterally until the edge of said plate is in alignment with the cutter, so that the superfluous material—that is, that outside of a straight line bounding the outer type—margining the outer column can be removed. The bed is then pushed longitudinally on the tracks a a to and over the cutter, which removes the superfluous margin of the plate, and after this is done the bed is returned to its original position. Another revolution of shaft i is then taken, thus pushing the stereotype-plate against the gage-strip e', whereupon the space between the outer column of the plate and the next adjacent one will be in alignment with the cutter and the center of width of said outer column will be in longitudinal alignment with the grooving-saw. The rock-shaft G is then oscillated so as to clamp the column about to be separated from the rest of the plate between plate F and strip e. The bed carrying said plate is again moved longitudinally to and over the cutter and grooving-saw, and said column is separated from the rest of the plate, trimmed on its inner edges, (adjacent to those of the following column,) and grooved, after which the bed is then again returned to its original position. The rock-shaft G is now turned so as to lift the clamping-plate from and at the same time tip the column under it, so that it either slides down the inclined plane or is pushed down the same by the action of the arms h. The operation, as before explained, is then repeated, and so on until the whole plate of stereotype-matter is separated into columns.

The cutter which we use in our machine is enabled to saw the plate into columns, and at the same time trim the edges of each of said columns, by reason of its having its periphery divided into sections, each section to have a leader-tooth whose projection is greater than the others, and having following said leader a train of smaller teeth, whose lateral projection is so graduated that as they revolve they trim the edges of the kerf made by the leader-teeth.

We do not, in giving this brief description, wish to be debarred from making a separate application therefor, as such is now our intention.

What we claim as new is—

1. The combination, with a longitudinally-reciprocating bed, of a combined separating and trimming cutter and a grooving-saw inclined toward said cutter, as set forth.

2. In a stereotyper's sawing, trimming, and grooving machine, the combination of a revolving cutter adapted to saw stereotype-plates and to trim the sides of the kerf so made, and a grooving-saw inclined toward said cutter at a suitable angle, so that the uppermost point of its periphery is removed from said cutter a suitable distance and is on a plane slightly below that of the uppermost part of the periphery of said cutter.

3. The combination, with a longitudinally-reciprocating bed and a laterally-movable longitudinal feed-plate thereon, of a combined separating and trimming cutter and a grooving-saw inclined toward said cutter, as set forth.

4. The combination, with a longitudinally-reciprocating bed having racks secured to its transverse edges, feed-plate I, and shaft i, journaled on said plate and having pinions on it meshing with said racks, of a combined separating and trimming cutter and an inclined grooving-saw, as set forth.

5. The combination, in a combined stereotyper's sawing, trimming, and grooving machine, with a longitudinally-reciprocating bed having transverse racks along its front and rear edges, of the feed-plate I, having guide-frames near its ends, shaft i, journaled in bearing-blocks movable laterally in said guide-frames and provided with offsets or eccentrics at suitable intervals, and the oscillating bars journaled on said offsets and pivotally connected at their opposite ends to plate I, as described.

6. In a stereotyper's sawing, trimming, and grooving machine, the combination, with the bed and the longitudinal feed-plate thereon, of the transverse adjusting-plates n n, having the arms depending from one end thereof, clamp-plates s s, and thumb-screws t t, as set forth.

7. In a stereotyper's sawing, trimming, and grooving machine, the combination, with the bed having racks on the transverse edge thereof and the feed-plate I thereon, of shaft $i$, journaled on said plate I, and having pinions thereon engaging with said racks, and the adjusting-plates $n\,n$, clamp-plates $s\,s$, and thumb-screws $t\,t$, as set forth.

8. In a stereotyper's sawing, trimming, and grooving machine, the combination, with the bed and the laterally-moving feed-plate I thereon, of the adjusting-plates $n\,n$ and screws $n'\,n'$, as set forth.

9. In a stereotyper's sawing, trimming, and grooving machine, the combination, with the bed and the laterally-moving feed-plate I thereon, of the adjusting-plate and gage-screws $n'\,n'$, clamping-plates $s\,s$, and thumb-screws $t\,t$, as set forth.

10. In a stereotyper's sawing, trimming, and grooving machine, the combination, with the bed and the laterally-moving feed-plate I thereon, of the rock-shaft G and oscillating presser-plate F, substantially as set forth.

11. In a stereotyper's sawing, trimming, and grooving machine, the combination, with the laterally-movable feed-plate I thereon, of the adjusting-plate and the clamping-plate F, as set forth.

12. In a stereotyper's sawing, trimming, and grooving machine, the combination, with the longitudinally-reciprocating bed, rack $d\,d$, secured thereto over the lateral edges thereof, and gage-bar $e'$, of the laterally-movable feed-plate I, as set forth.

13. In a stereotyper's sawing, trimming, and grooving machine, the combination, with the longitudinally-reciprocating bed and gage-bar $e'$, of the clamping-plate F and feed-plate I, as set forth.

14. In a stereotyper's sawing, trimming, and grooving machine, the combination, with the bed, having racks $d$ on the lateral edges thereof, the guard-strip $e$, and gage-bar $e'$, of the clamping-plate F and feed-plate I, as specified.

15. The combination, with the bed, of the plate F, rock-shaft G, having eccentrics or offsets thereon, and links $f\,f$.

16. The combination, with the bed, of the plate F, having its bearing-surface faced with leather, rock-shaft G, having eccentrics or offsets $g\,g$, and links $f\,f$.

17. The combination, with the bed, of the plate F, rock-shaft G, links connecting said plate and shaft, and the arms $h\,h$.

18. The combination, with the bed, the cutters C, and saw D, of the inclined plane H, placed parallel with the side edges of the bed, adjacent to the said cutter and saw and near the front of the machine, as set forth.

19. The combination, with the bed and inclined plane H, as described, of rock-shaft G and the arms $h\,h$.

20. The combination, with the bed and the inclined plane, as described, of the oscillating clamping-plate F and the tipping-arms $g'\,g'$, as set forth.

21. The combination, with the bed and the inclined plane, as described, of the oscillating clamping-plate F, the tipping-arms $g'\,g'$, the rock-shaft G, and the arms $h\,h$.

JOHN R. CUMMINGS.
GEORGE E. LLOYD.

Witnesses:
FRANK D. THOMASON,
PORTER B. COOLIDGE.